United States Patent
Koskinen et al.

(10) Patent No.: US 11,382,122 B2
(45) Date of Patent: Jul. 5, 2022

(54) BROADCAST SIGNALING OPTIMIZATION FOR MACHINE TYPE COMMUNICATION

(71) Applicant: Nokia Technologies Oy, Espoo (FI)

(72) Inventors: Jussi-Pekka Koskinen, Oulu (FI); Jarkko Tuomo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/126,132

(22) PCT Filed: Mar. 19, 2014

(86) PCT No.: PCT/US2014/031240
§ 371 (c)(1),
(2) Date: Sep. 14, 2016

(87) PCT Pub. No.: WO2015/142329
PCT Pub. Date: Sep. 24, 2015

(65) Prior Publication Data
US 2017/0079063 A1    Mar. 16, 2017

(51) Int. Cl.
*H04W 72/12*    (2009.01)
*H04W 4/70*    (2018.01)
(Continued)

(52) U.S. Cl.
CPC ......... *H04W 72/1289* (2013.01); *H04W 4/70* (2018.02); *H04W 48/12* (2013.01); *H04W 48/16* (2013.01); *H04W 4/06* (2013.01)

(58) Field of Classification Search
CPC . H04W 72/1289; H04W 4/005; H04W 48/12; H04W 48/16; H04W 4/06
See application file for complete search history.

(56) References Cited

U.S. PATENT DOCUMENTS 9,699,710 B2 * 7/2017 Lee ................. H04W 76/14
9,854,382 B2 * 12/2017 Xu ................... H04W 4/06
(Continued)

FOREIGN PATENT DOCUMENTS

WO    2011085195 A1    7/2011

OTHER PUBLICATIONS

International Search Report and Written Opinion received for corresponding Patent Cooperation Treaty Application No. PCT/US2014/031240, dated Dec. 17, 2014, 13 pages.
(Continued)

*Primary Examiner* — Christopher M Crutchfield
*Assistant Examiner* — Tito Q Pham
(74) *Attorney, Agent, or Firm* — Mintz Levin Cohn Ferris Glovsky and Popeo, P.C.

(57) ABSTRACT

Methods and apparatus, including computer program products, are provided for allowing cell access. In one aspect there is provided a method, which may include determining, by a user equipment whether a cell allows a communication type, wherein the determining is based on at least one of a scheduling information included in a first type of broadcast message received by the user equipment or a receipt of a second type of broadcast message by the user equipment; and initiating, by the user equipment based on at least the determining, a connection to cell, when at least one of the scheduling information or the second type of broadcast message indicates the communication type is allowed in the cell. Related systems, articles of manufacture, and the like are also disclosed.

10 Claims, 4 Drawing Sheets

(51) Int. Cl.
*H04W 48/12* (2009.01)
*H04W 48/16* (2009.01)
*H04W 4/06* (2009.01)

(56) References Cited

U.S. PATENT DOCUMENTS

| | | | | |
|---|---|---|---|---|
| 2013/0343319 A1* | 12/2013 | Quan | ............... | H04W 48/08 |
| | | | | 370/329 |
| 2014/0198685 A1* | 7/2014 | Xu | ............... | H04W 24/02 |
| | | | | 370/254 |
| 2015/0256959 A1* | 9/2015 | Jain | ............... | H04W 4/06 |
| | | | | 370/312 |
| 2015/0327155 A1* | 11/2015 | Lee | ............... | H04W 76/14 |
| | | | | 370/329 |
| 2015/0341957 A1* | 11/2015 | Tang | ............... | H04W 72/1289 |
| | | | | 370/329 |

OTHER PUBLICATIONS

Huawei et al., "RAN2 Impacts of Low Cost MTC", 3GPP Draft; R2-140277 RAN2 Impacts of Low Cost MTC, 3rd Generation Partnership Project (3GPP), Mobile Competence Centre; 650, Route Des Lucioles; F-06921 Sophia-Antiopolis Cedex; France, vol. Ran WG2, No. Prague, Czech Republic; Feb. 10, 2014-Feb. 14, 2014 Feb. 9, 2014.

Ericsson, "Transport Block Size Limitation for Low Cost MTC UEs" 3GPP Draft; R2-140673—Transport Block Size Limitation for Low Cost MIC UES, 3rd Generation Partnership Project (3GPP), Mobile Competence Centre; 650, Route Des Lucioles; F-06921 Sophia-Antipolis, vol. RAN WG2, No. Prague, Czech Republic Feb. 10, 2014-Feb. 14, 2014, Jan. 31, 2014, XP050754228, Retrieved from the Internet: URL:http//www.3gpp.org/ftp/tsg_ran/W2_RL2/TSGR2_85/Doc/ [retrieved on Jan. 31, 2014].

3GPP, "Technical Specification Group Radio Access Netwoke; Evolved Universal Terrestrial Radio Access (E-UTRA); Physical layer: Measurements (Release 11)," 3rd Generation Partnership Project, 3GPP TS 36.214 V.11.1.0, Dec. 2012.

3GPP, "Technical Specification Group Radio Access Network; Evolved Universal Terrestrial Radio Access (E-UTRA); LTE physical layer; General description (Release 11)," 3rd Generation Partnership Project, 3GPP TS 36.201 V11.1.0, Dec. 2012.

3GPP, "Technical Specification Group Radio Access Network; Evolved Universal Terrestrial Radio Access (E-UTRA); Multiplexing and channel coding (Release 12)," 3rd Generation Partnership Project, 3GPP TS 36.212 V12.0.0, Dec. 2013.

3GPP, "Technical Specification Group Radio Access Network; Evolved Universal Terrestrial Radio Access (E-UTRA); Physical channels and modulation (Release 12)," 3rd Generation Partnership Project, 3GPP TS 36.211 V.12.0.0., Dec. 2013.

3GPP, "Technical Specification Group Radio Access Network; Evolved Universal Terrestrial Radio Access (E-UTRA); Physical layer procedures (Release 12)," 3rd Generation Partnership Project, 3GPP TS 36.213 V12.0.0, Dec. 2013.

3GPP, "Technical Specification Group Radio Access Network; Evolved Universal Terrestrial Radio Access (E-UTRA); Radio Resource Control (RRC); Protocol specification (Release 11)," 3rd Generation Partnership Project, 3GPP TS 36.331 V.11.3.0, Mar. 2013.

3GPP, "EAB update mechanism," Samsung, 3GPP TSG RAN WG2 #76, R2-116244, Nov. 14-18, 2011. (4 pages).

* cited by examiner

BROADCAST SIGNALING OPTIMIZATION FOR MACHINE TYPE COMMUNICATION

RELATED APPLICATION

This application was originally filed as Patent Cooperation Treaty Application No. PCT/US2014/031240 filed Mar. 19, 2014.

FIELD

The subject matter described herein relates to wireless machine communications.

BACKGROUND

The phrase machine type communications (MTC) generally refers to a variety of technologies that include devices, such as sensors and/or other machines, communicating information, such as an event and/or any other information, through a network to another device or service, such as a backend server application. The Internet of Things is an example of a use MTC, although other scenarios may implement MTC as well. In the case of the Third Generation Partnership Project (3GPP), MTC may use the wireless networks configured in accordance with 3GPP standards. As such, MTC may access 3GPP wireless networks, such as Long Term Evolution (LTE) radio access networks, to provide information to, for example, the backend application.

SUMMARY

Methods and apparatus, including computer program products, are provided for allowing cell access.

In some example embodiments, there is provided a method, which may include determining, by a user equipment whether a cell allows a communication type, wherein the determining is based on at least one of a scheduling information included in a first type of broadcast message received by the user equipment or a receipt of a second type of broadcast message by the user equipment; and initiating, by the user equipment based on at least the determining, a connection to cell, when at least one of the scheduling information or the second type of broadcast message indicates the communication type is allowed in the cell.

In some variations, one or more of the features disclosed herein including the following features can optionally be included in any feasible combination. The communication type may include machine type communications. The first type of broadcast message may include a system information block type 1. The second type of broadcast message may be at least one of known or defined to support at least one of machine type communications or coverage enhancements for machine type communications. The user equipment may scan based on at least the determining, for another cell, when the communication type is not allowed in the cell. The scheduling information may indicate the communication type is allowed in the cell, when the scheduling information includes scheduling for the second type of broadcast message, wherein the second type of broadcast message is defined to support the communication type.

In some example embodiments, there is provided a method, which may include sending at least one of a first type of broadcast message or a second type of broadcast message, wherein the first type of broadcast message includes scheduling information of the second type of broadcast message, wherein the second type of broadcast message is defined to support a communication type supported at a cell; and allowing, in response to the sending, the communication type access to the cell by a user equipment.

In some variations, one or more of the features disclosed herein including the following features can optionally be included in any feasible combination. The communication type may include machine type communications. The first type of broadcast message may include a system information block type 1. The second type of broadcast message may be at least one of known or defined to support at least one of machine type communications or coverage enhancements for machine type communications. The scheduling information may indicate the communication type is allowed in the cell, when the scheduling information includes scheduling for the second type of broadcast message.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
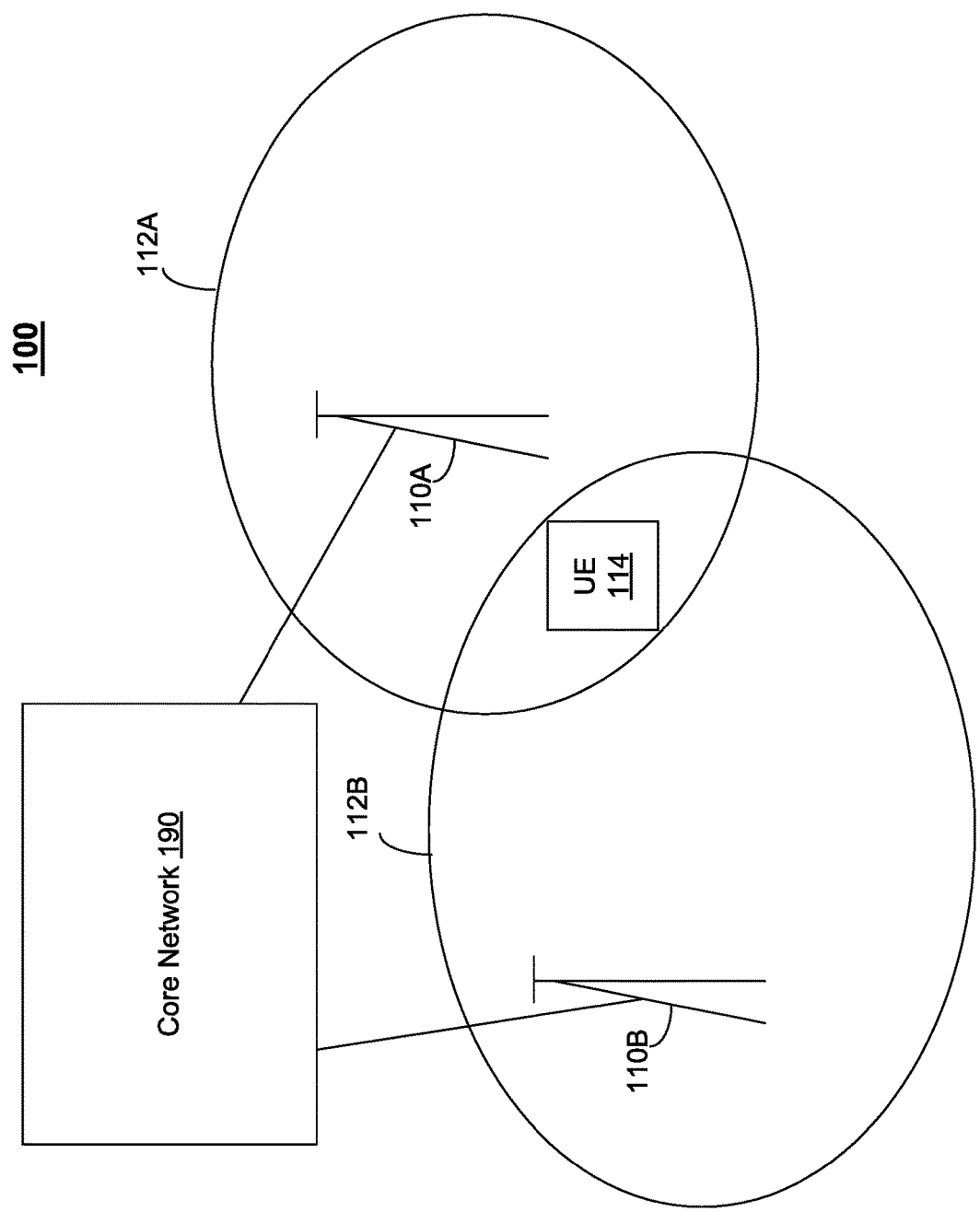
FIG. 1 depicts an example of a system including a machine type communications user equipment, in accordance with some example embodiments.

Like labels are used to refer to same or similar items in the drawings.

DETAILED DESCRIPTION

A user equipment (UE) may be configured to provide machine type communications (MTC). For example, the MTC UE may provide sensor data to another device and/or backend server via a network including a wireless access network. As such, the MTC UE may need to know whether MTC access is allowed or not on a given cell. Although a specific indication may be used by a base station/access point serving the cell to explicitly signal to UEs whether MTC is allowed or not on the cell, the specific indication may require additional radio resources to carry the indication.

Instead of an explicit indication signaling whether MTC is allowed or not in the cell, the MTC UE may, in some example embodiments, determine whether a given cell supports MTC or coverage enhancement (CE) for MTC in a cell based on implicit indication(s). CE may refer to coverage enhancements in a cell to accommodate MTC. These enhancements may relate to MTC changes for improved coverage of the uplink data channel, VoIP, medium data rate physical uplink shared channel, and/or the like. In some example embodiments, the implicit indication may be based on scheduling information included in a specific type of message, such as a system information message or block. Alternatively or additionally, the implicit indication may be based on a specific type of SIB being broadcasted. For example, the MTC UE may search for a cell where the MTC UE can camp. When the MTC UE finds a cells and reads one or more SIBs, the MTC UE may receive a certain type of SIB, and from this certain type of SIB, the MTC UE may determine whether camping is allowed in the cell. If so, the MTC UE may camp on that cell.

In some example embodiments, the UE may determine whether a given cell supports MTC based on whether a SIB includes scheduling information for a certain SIB type defined (or known) to allow MTC. For example, if the MTC UE determines that a specific type of SIB (for example, SIB Type 1 (SIB1) which is broadcast in a cell) includes scheduling information and this scheduling information includes a SIB type that is defined (or known) to allow MTC, the MTC UE may determine that the cell allows MTC or access is allowed.

In the case of SIB1, the UE may receive and/or read SIB1 when evaluating cell access, and SIB1 may include scheduling information indicative of the scheduling of other SIBs. As such, if SIB1 schedules at least one SIB type that has been defined (or known) to allow MTC and/or cell coverage enhancements for MTC, then the MTC UE may determine that the cell broadcasting the SIB1 allows MTC. However, if SIB1 does not include scheduling information for the at least one certain SIB type defined (or known) to allow MTC, the UE may determine that the cell broadcasting SIB1 does not currently allow MTC. In this way, the MTC UE may determine whether MTC communications are allowed based on scheduling information carried by SIB1 without adding an explicit signaling bit(s) indicating whether or not the cell allows MTC or MTC coverage enhancement.

In some example embodiments, the MTC UE may determine a cell's accessibility/suitability for MTC or MTC coverage enhancement (CE) based one or more of the following: (1) if a certain SIB type defined for use with low cost MTC (and/or enhanced MTC coverage) is scheduled via SIB1 on a certain cell, the UE may then presume MTC communications access is allowed on that certain cell; (2) if the certain SIB type defined for low cost MTC is not scheduled via SIB1, then the UE may presume that MTC access is not allowed on that certain cell; and/or (3) if a certain type of SIB(s) is broadcast by the cell, MTC access may not be allowed.

Before providing additional examples related to whether cells allow MTC and/or coverage enhancements for MTC, the following provides a description of an example of a system, in accordance with some example embodiments.

FIG. 1 depicts a system 100 including a core network 190, a plurality of base stations 110A-B serving cells 112A-B, and a UE 114 configured as an MTC UE (or low cost MTC UE and/or any other type of UE), in accordance with some example embodiments.

The mobile network may be divided into radio access network (RAN) and core network (CN) 190. The radio access network may consist of at least base stations 110A-B that serve cells 112A-B. Some of the cells may allow MTC and/or CE, while others may not. As such, MTC UE 114 may need to know whether a given cell supports MTC or CE for MTC. Moreover, MTC UE 114 may receive broadcast information, such as one or more SIBs, from one or more base stations 110A-B and the like.

In some example embodiments, UE 114 may be implemented as a mobile device and/or a stationary device. The user equipment 114 may be referred to as, for example, a wireless device, a sensor, a low cost wireless sensor, a wireless sensor, a machine type communications device, a low cost machine type communications device, a mobile station, a mobile unit, a subscriber station, a wireless terminal, a tablet, a smart phone, and/or the like. In some example embodiments, MTC UE 114 may be implemented as multi-mode user devices configured to operate using a plurality of radio access technologies, although a single-mode device may be used as well. For example, MTC UE 114 may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), near field communications (NFC), and any other radio access technologies. The user equipment may be located within the coverage area of a cell or multiple cells.

The UE may be configured to provide MTC, and the MTC UE may provide some of aspects of MTC in accordance with a standard, although some aspects may not be specified in a standard. In the case of a standard-specified MTC UE, the UE may support LTE duplex modes supporting the following capabilities: at least one receive antenna, downlink and uplink maximum total block size of about 1000 bits, and/or a reduced downlink channel bandwidth of about 1.4 MHz for the data channel in baseband, although other capabilities may be provided as well. The MTC UE disclosed herein may be a dedicated MTC device, although the MTC UE may also be any other type of device, such as a tablet, smartphone, and/or the like configured to provide MTC.

The base stations 110A-B may also be configured as an evolved Node B (eNB) type base station, although other types of base stations and wireless access points may be used as well. In the case of eNB type base station, the base station may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). The base station may also be configured to serve cells using a WLAN technology, such as WiFi (for example, the IEEE 802.11 series of standards), as well as any other radio access technology capable of serving a cell. Base stations 110A-B may have wired and/or wireless backhaul links to other networks and/or network nodes including core network 190. Base stations 110A-B may be configured to broadcast one or more systems information blocks (SIBs), and the SIBs may be of different types. For example, a SIB 1 may refer to a SIB of Type 1 that may be broadcast by a base station serving a given cell, and read by one or more UEs considering accessing the given cell. SIB1 may, as noted, include schedule information defining or indicating when other types of SIBs may be broadcast in the cell.

The system information block may be in accordance with 3GPP, TS 36.331. For example, a network node, such as a base station may send a system information message as for example a broadcast message. The system information message may include or indicate one or more system information blocks. SIBs (other than SIB Type 1) may be carried by system information messages, and the mapping of SIBs to system information messages may be configured by scheduling information included in SIB Type 1 message. The SIB Type 1 may, as noted, include information relevant when evaluating if a UE is allowed to access a cell and may define the scheduling of other system information.

Although FIG. 1 depicts a certain quantity and configuration of devices, other quantities and configurations may be implemented as well. For example, other quantities and configurations of base stations, cells, and user equipment may be implemented as well.

Figure 2:
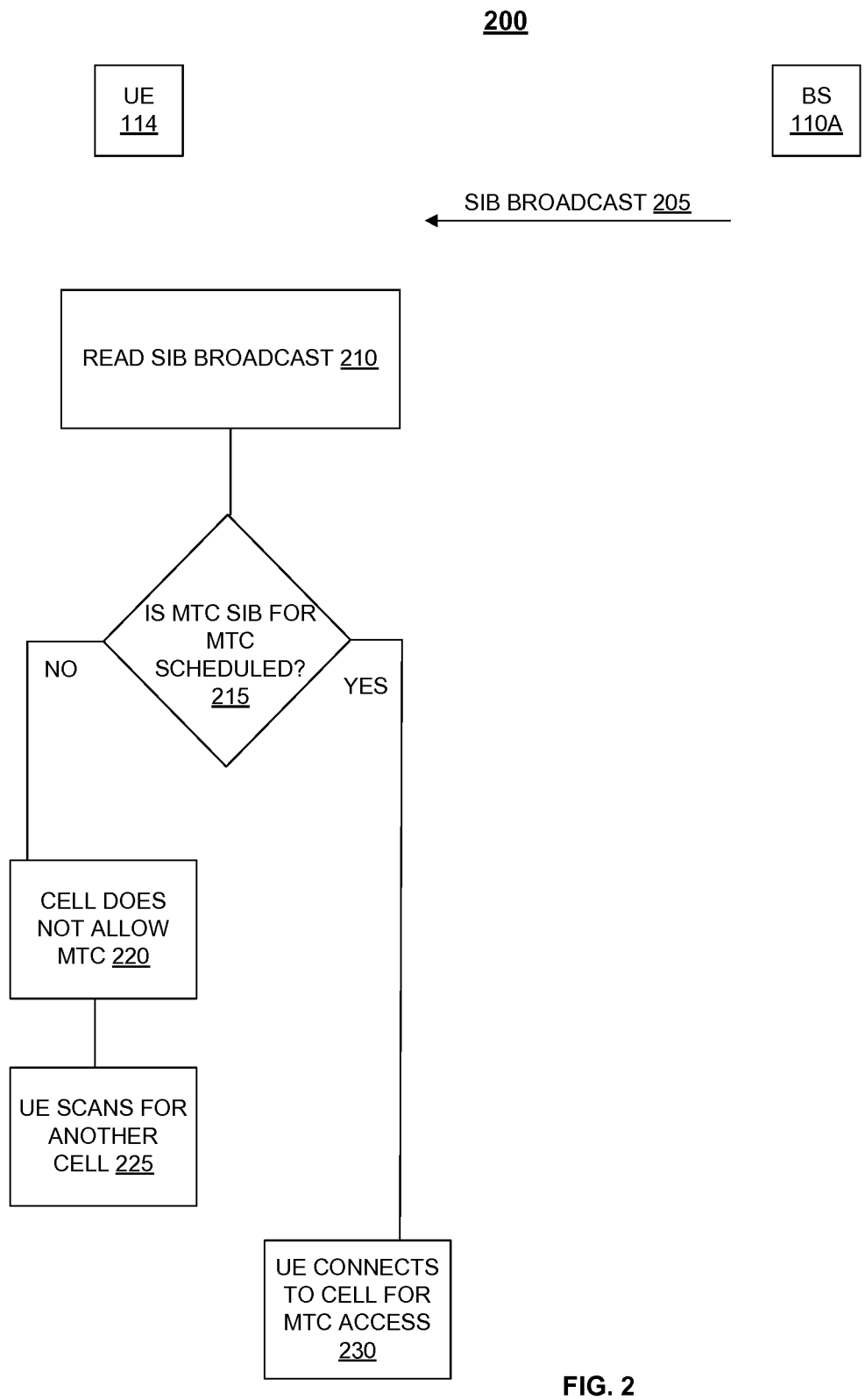
FIG. 2 depicts an example of a process 200 for determining whether or not a cell allows machine type communications, in accordance with some example embodiments.

FIG. 2 depicts an example process 200 for determining whether or not a cell allows MTC or coverage enhancements for MTC, in accordance with some example embodiments. The description of process 200 also refers to FIG. 1.

At 205, base station 110A serving cell 112A may broadcast a message, such as SIB1, in accordance with some example embodiments. This SIB1 may be monitored by one or more UEs considering access to cell 112A. In this example, MTC UE 114 may read, at 210, the broadcasted SIB1 to determine whether SIB1 includes scheduling information indicative of another type of SIB allowing MTC and/or coverage enhancements for MTC. For example, if SIB1 includes a schedule listing another type of SIB known, or defined, to support MTC, MTC UE 114 may determine that cell 112A allows MTC (or MTC coverage enhancements) and, when this is the case, MTC UE 114 may connect to cell 112A for MTC (yes at 215 and 230). To illustrate further, if the scheduling information included in SIB1 indicates that SIB Type 17 (which in this example carries low cost MTC UE specific information although other types may be defined to support MTC/CE as well) is scheduled for cell 112A, MTC UE may determine that cell 112A allows MTC (or coverage enhancements for MTC), and thus connect to cell 112A.

However, if SIB1 does not include a schedule listing a type of SIB known, or defined, to support MTC, MTC UE 114 may determine that cell 112A does not allow MTC (or MTC coverage enhancements) and thus not connect to cell 112A for MTC, and instead scan for other cells which might allow MTC (no at 215 and 225). For example, if the scheduling information included in SIB1 indicates that SIB Type 3, SIB Type 4, and SIB Type 5 (which in this example are all SIB types that may not allow MTC communications), MTC UE 114 may determine that cell 112A does not allow MTC and, as such, scan for another cell that does allow MTC.

The certain SIB type defined (or known) to allow MTC may, in some example embodiments, include neighbor cell lists specific to the MTC UE (and allowing MTC access) and/or a limited set of parameters required for MTC access the system.

Figure 3:
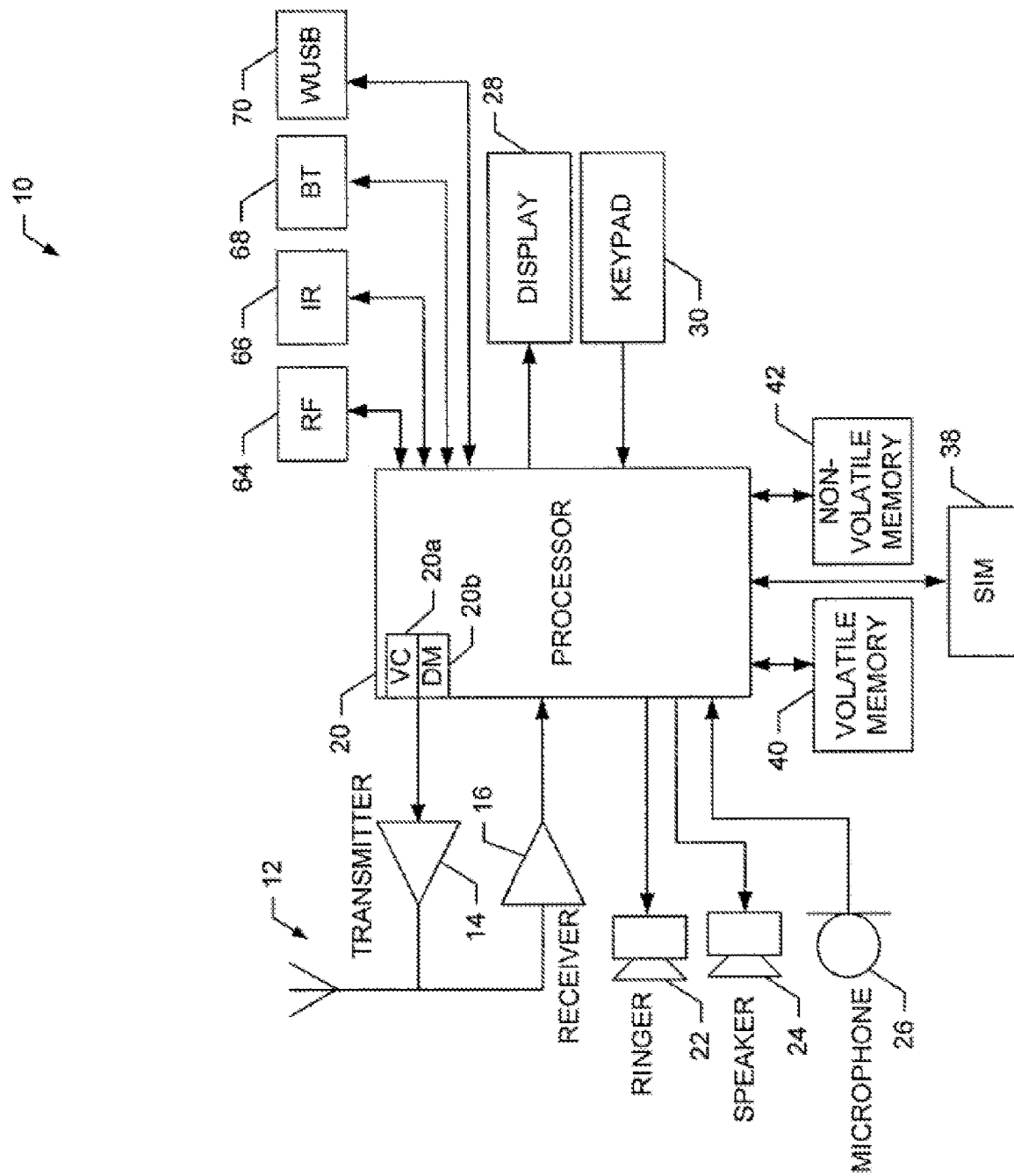
FIG. 3 depicts an example of a user equipment, in accordance with some example embodiments.

FIG. 3 illustrates a block diagram of an apparatus 10, in accordance with some example embodiments. The apparatus 10 (or portions thereof) may be configured to provide a MTC UE, such as a low cost wireless sensor and the like.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations, such as process 200 and/or any other operations/functions disclosed herein. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to the MTC UE, such as determining, based on a scheduling information included in a first type of broadcast message, whether a cell allows machine type communications; connecting to the cell, when the scheduling information includes a second type of broadcast message supporting machine type communication on the cell; and scanning for another cell, when the scheduling information does not include the second type of broadcast message.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 3, computer-readable medium may comprise a non-transitory computer-readable storage medium that may be any media that can contain or store the instructions for use by or in connection with an instruction execution system, apparatus, or device, such as a computer.

Figure 4:
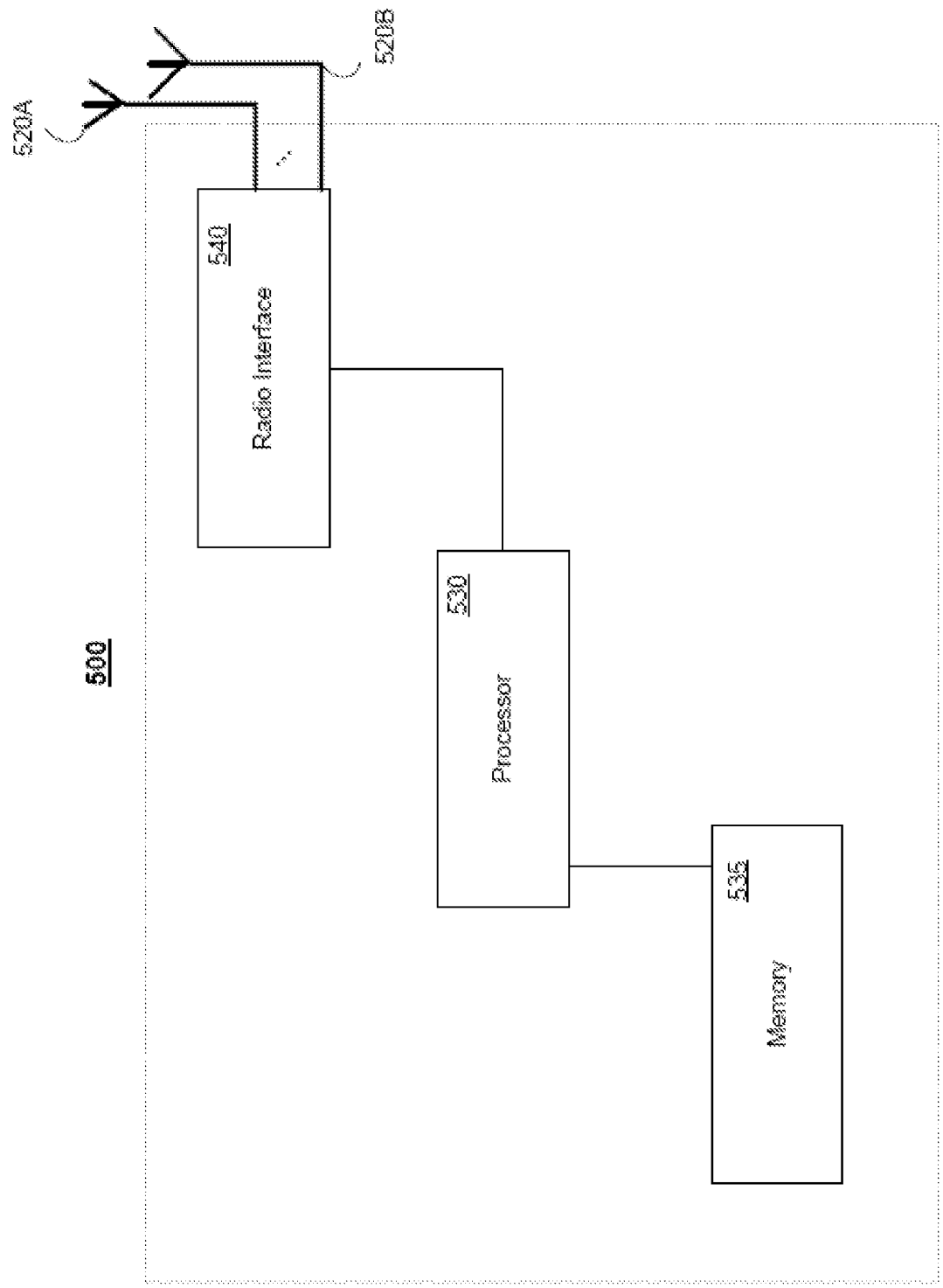
FIG. 4 depicts an example of a network node, in accordance with some example embodiments.

FIG. 4 depicts an example implementation of a wireless access point 500, which may be implemented at for example base station 110A, in accordance with some example embodiments. The wireless access point may include one or more antennas 520 configured to transmit via downlinks and configured to receive uplinks via the antenna(s) 520. The wireless access point may further include a plurality of radio interfaces 540 coupled to the antenna(s) 520. The radio interfaces 540 may correspond to a plurality of radio access technologies including one or more of LTE, WLAN, Bluetooth, Bluetooth low energy, NFC, radio frequency identifier (RFID), ultrawideband (UWB), ZigBee, ANT, and the like. The radio interface 540 may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). The wireless access point may further include one or more processors, such as processor 530, for controlling the wireless access point 500 and for accessing and executing program code stored in memory 535. In some example embodiments, the memory 535 includes code, which when executed by at least one processor, causes one or more of the operations described herein with respect to a network node, such as base station 110A and the like. For example, the wireless access point 500 may be configured to broadcast information, such as SIB messages, some of the SIBs may be known or defined to support MTC communications, while other SIBs may not be known to support MTC; allow a connection from an MTC UE when scheduling information included in SIB Type 1 indicates a SIB type known or defined to allow MTC.

Without in any way limiting the scope, interpretation, or application of the claims appearing below, a technical effect of one or more of the example embodiments disclosed herein is a radio resource savings by not using explicit signaling to indicate whether or not a cell supports MTC or coverage enhancements at the cell for MTC.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of the subject matter disclosed herein are set out in the independent claims, other aspects of the subject matter disclosed herein comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present subject matter disclosed herein as defined in the appended claims. Other embodiments may be within the scope of the following claims. The term "based on" includes "based on at least." The use of the phase "such as" means "such as for example" unless otherwise indicated.

What is claimed is:

1. A method comprising:
   determining, by a user equipment, whether a cell allows machine type communications or coverage enhancement for machine type communications, wherein the determining is based on whether or not a second type of broadcast message is scheduled in a first type of broadcast message received by the user equipment, wherein the second type of broadcast message is defined to support at least one of the machine type communications or the coverage enhancement for machine type communications; and
   initiating, by the user equipment based at least on a determination that the cell allows machine type communications or coverage enhancements for machine type communications, a connection to the cell.

2. A method as in claim 1, wherein the first type of broadcast message comprises a system information block type 1.

3. A method as in claim 1, further comprising:
   scanning, by the user equipment based on at least the determining, for another cell, when machine type communications are not allowed in the cell.

4. A method as in claim 1, wherein the determining comprises:
   in response to the second type of broadcast message being scheduled in the first type of broadcast message received by the user equipment, determining that the machine type communications or the coverage enhancement for machine type communications is allowed in the cell.

5. A method as in claim 1, wherein the determining further comprises:
   determining that machine type communications or coverage enhancement is not allowed, in response to the second type of broadcast message not being scheduled in the first type of broadcast message received by the user equipment.

6. An apparatus comprising:
at least one processor; and
at least one memory including computer program code, the at least one memory and the computer program code configured to, with the at least one processor, cause the apparatus to at least:
   determine whether a cell allows machine type communications or coverage enhancement for machine type communications, wherein the determination is based on whether or not a second type of broadcast message is scheduled in a first type of broadcast message received by the apparatus, wherein the second type of broadcast message is defined to support at least one of the machine type communications or the coverage enhancement for machine type communications; and
   initiate, based at least on a determination that the cell allows machine type communications or coverage enhancements for machine type communications, a connection to the cell.

7. An apparatus as in claim 6, wherein the first type of broadcast message comprises a system information block type 1.

8. An apparatus as in claim 6, wherein the apparatus is further configured to scan, based on at least the determination, for another cell, when machine type communications are not allowed in the cell.

9. An apparatus as in claim 6, wherein the determining comprises:
   in response to the second type of broadcast message being scheduled in the first type of broadcast message received by the apparatus, determining that the machine type communications or the coverage enhancement for machine type communications is allowed in the cell.

10. An apparatus as in claim 6, wherein the determining by the apparatus further comprises:
   determining that machine type communications or coverage enhancement is not allowed, in response to the second type of broadcast message not being scheduled in the first type of broadcast message received by the apparatus.

* * * * *